United States Patent
Bierkamp et al.

(10) Patent No.: US 8,146,986 B2
(45) Date of Patent: Apr. 3, 2012

(54) DASHBOARD SUPPORT, AND METHOD OF MAKING A DASHBOARD SUPPORT

(75) Inventors: Roman Bierkamp, Erwitte (DE); Andreas Hitz, Erwitte (DE); Stefan Hilgenberg, Schlagen (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 278 days.

(21) Appl. No.: 12/436,438

(22) Filed: May 6, 2009

(65) Prior Publication Data
US 2009/0302641 A1 Dec. 10, 2009

(30) Foreign Application Priority Data

Jun. 4, 2008 (DE) .......................... 10 2008 026 631

(51) Int. Cl.
B62D 25/08 (2006.01)

(52) U.S. Cl. ...................................... 296/193.02; 296/72

(58) Field of Classification Search .................... 296/70, 296/72, 193.06, 193.02; 248/220.41, 225.11
See application file for complete search history.

(56) References Cited

U.S. PATENT DOCUMENTS

| 5,564,769 | A | * | 10/1996 | Deneau et al. ................. 296/72 |
| 5,899,035 | A | * | 5/1999 | Waalkes et al. ................ 52/239 |
| 5,934,733 | A | | 8/1999 | Manwaring |
| 6,391,470 | B1 | * | 5/2002 | Schmieder et al. ........... 428/598 |
| 7,780,187 | B2 | * | 8/2010 | Minamikawa ............. 280/728.2 |
| 2003/0084948 | A1 | | 5/2003 | Tanaka et al. |

FOREIGN PATENT DOCUMENTS

| DE | 195 31 876 | | 3/1997 |
| DE | 299 16 470 | | 1/2000 |
| DE | 102 14 473 | | 10/2003 |
| DE | 103 59 746 | | 7/2005 |
| DE | 102005012816 | | 12/2005 |
| EP | 0 990 578 | | 2/2002 |
| EP | 1529720 | * | 5/2005 |
| WO | WO 01/94189 | | 12/2001 |

\* cited by examiner

*Primary Examiner* — Dennis Pedder
(74) *Attorney, Agent, or Firm* — Henry M. Feiereisen; Ursula B. Day

(57) ABSTRACT

A dashboard support for a motor vehicle includes a tubular cross member for installation between A-pillars of a vehicle body, and a holder joined to the cross member for attachment of functional vehicle components. The cross member has at least one slot, oriented in a direction transversely to a longitudinal axis of the cross member, for receiving a limb of the holder such as to allow adjustment of a position of the holder in relation to the cross member by sliding and/or turning the limb before the holder is being joined to the cross member.

11 Claims, 3 Drawing Sheets

DASHBOARD SUPPORT, AND METHOD OF MAKING A DASHBOARD SUPPORT

CROSS-REFERENCES TO RELATED APPLICATIONS

This application claims the priority of German Patent Application, Serial No. 10 2008 026 631.0, filed Jun. 4, 2008, pursuant to 35 U.S.C. 119(a)-(d), the content of which is incorporated herein by reference in its entirety as if fully set forth herein.

BACKGROUND OF THE INVENTION

The present invention relates to a dashboard support, and a method of making a dashboard support.

The following discussion of related art is provided to assist the reader in understanding the advantages of the invention, and is not to be construed as an admission that this related art is prior art to this invention.

Dashboard supports are used in motor vehicles as a support for various cockpit functions and include a cross member which is placed between the A-pillars transversely to the travel direction to provide a reinforcement of the vehicle body. The cross member is normally produced in the automobile industry from one or more support beams. The dashboard has to meet several functions. In addition to provide reinforcement of the body for absorbing energy in the event of a crash and to connect various spatial points as well as to secure various holders for the instrument panel, the dashboard support is also used for mounting and securement of further functional vehicle components such as steering column, heating and air conditioning systems, airbag, center console, fuse box or glove compartment.

To secure the functional vehicle components or their mounts, holes, recesses, or protuberances are formed in the cross member as attachment points. Some of the attachment points are provided with connecting elements, such as nuts or bolts. Other connecting elements may be placed later, although this procedure proved labor-intensive and cost-intensive.

It would therefore be desirable and advantageous to provide an improved dashboard support which obviates prior art shortcomings and includes a cross member which is easy to manufacture and affords great flexibility for design options.

SUMMARY OF THE INVENTION

According to one aspect of the present invention, a dashboard support for a motor vehicle includes a tubular cross member for installation between A-pillars of a vehicle body, with the cross member having at least one slot oriented in a direction transversely to a longitudinal axis of the cross member, and a holder joined to the cross member for attachment of functional vehicle components and having a limb received in the slot which is sized to allow adjustment of a position of the holder in relation to the cross member before the holder is being joined to the cross member.

The present invention resolves prior art problems by providing the cross member with a slot which is oriented in a direction transversely to a longitudinal axis of the cross member and allows the position of the holder to be adjusted relative to the cross member before the holder is actually joined to the cross member and fixed in place. The adjustment of the holder can hereby be realized by sliding and/or turning the limb of the holder in the slot. As a result, the jointing position of cross member and holder can be precisely established before joining the holder to the cross member.

According to another advantageous feature of the present invention, the slot may have a length which exceeds a diameter of the cross member by more than half. In other words, the slot may extend by more than 180° about the circumference of the cross member. While the cross member is initially weakened as a result of the presence of the slot in order to gain a greater degree of freedom when attaching the holder, the subsequent joining operation between the holder and the cross member reestablishes however the required stiffness of the dashboard support.

The placement of the holder in the slot of the cross member allows a positioning of the holder translatorily in the direction of the X plane or Z plane as well as rotatorily, irrespective of a position of the cross member. As a result, the dashboard support can be modular in construction, whereby the cross member can be varied in relation to the position of the holder, or the position of the holder can be varied in relation to the cross member. A radial or rotatory displacement causes a turning of the holder with its limb. The position of the pivot point is freely selectable in space as a result of the attachment of the holder to the cross member in accordance with the present invention. Sliding the holder with its limb in the slot results in a rotatory displacement of the holder in the X plane or Z plane. The position of the holder is only limited by the lateral length of the limbs.

According to another advantageous feature of the present invention, the holder may have a U shaped configuration which is defined by two limbs interconnected by a bridge, with the cross member having two slots in parallel spaced-apart relationship for receiving the limbs of the holder respectively.

According to another aspect of the present invention, a method of making a dashboard support for a motor vehicle includes the steps of forming slots in a first member to be used as a cross member of the dashboard support, with the slots oriented in a direction transversely to a longitudinal axis of the first member, inserting in the slots limbs of a second member to be used as a holder of the dashboard support, adjusting a position of the second member in relation to the first member to establish a jointing position, and joining the second member to the first member.

The width of the slots and the width of the limbs are hereby geometrically suited to one another to allow the limbs to move with little play in the slots. Establishment of the jointing position can be realized by sliding and/or turning the holder and the cross member relative to one another before the holder is actually secured to the cross member, e.g. by means of material union, such as welding or soldering.

According to another advantageous feature of the present invention, two or more holders, e.g. for a steering column attachment, may be secured to the cross member at a defined axial distance to one another.

According to another advantageous feature of the present invention, the slots of the cross member can be oriented parallel to one another in a direction transversely to a longitudinal axis of the cross member.

As the holder can be freely positioned, a wide variety of designs of a dashboard support can be produced on the basis of a basic module, without the need to produce new tools. Only the orientation of cross member and holders relative to one another is changed to satisfy the required position of the attachment, when assembled together.

Providing the cross member with end flanges completes the dashboard support. A method of making a dashboard support in accordance with the present invention is efficient and cost-effective and allows a widest range of design options in view of the high degree of freedom in connection with the positioning of the various holders and the cross member.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
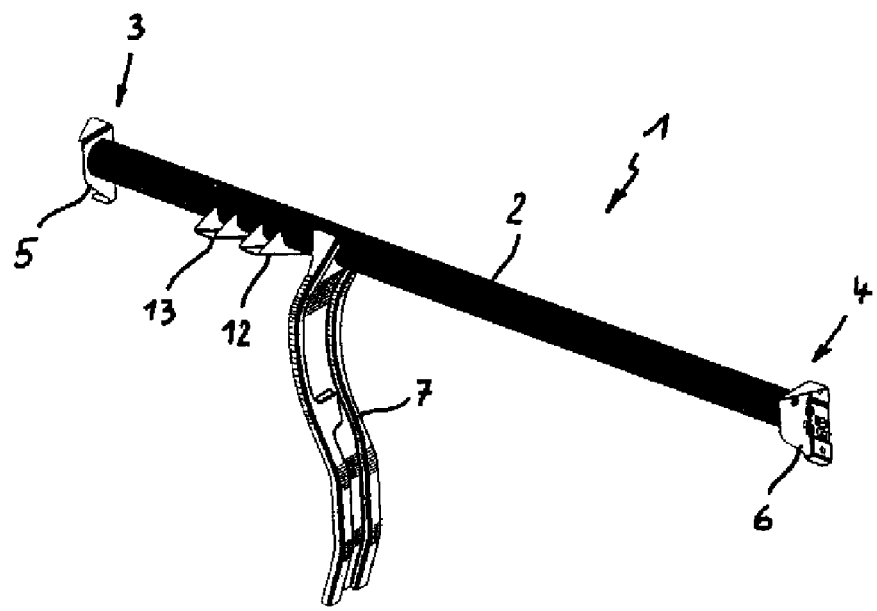
FIG. 1 is a perspective view of a dashboard support according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of a dashboard support according to the present invention, generally designated by reference numeral 1. The dashboard support 1 includes a cross member 2 which is installed transversely between unillustrated A-pillars of a motor vehicle. The cross member 2 has a tubular configuration or is made from a tube as base module, and has opposite ends 3, 4 which are provided with flanges 5, 6, respectively. The dashboard support 1 is mounted to the A-pillars of a vehicle body via the flanges 5, 6. Reference numeral 7 designates a mounting for a functional vehicle component, in this case a center console, and is joined to the cross member 2.

As shown in particular in FIGS. 1 to 4, the cross member 2 is provided with slots 8, 9, 10, 11. The slots 8, 9, 10, 11 are oriented radially transversely to the longitudinal axis L of the cross member 2 and extend over more than half of the diameter of the cross member 2. In other words, the slots 8, 9, 10, 11 extend over more than half of the circumference of the cross member 2. Holders 12, 13 are placed in the slots 8, 9, 10, 11. The holders 12, 13 have a U-shaped configuration, defined by a bridge 14 and two limbs 15, 16. The limbs 15, 16 of the holder 12 are inserted in the neighboring slots 8, 9 which are spaced-apart at a distance a1. Likewise, the limbs 15, 16 of the holder 13 are inserted in the neighboring slots 10, 11 which are also spaced-apart at the distance a1. The actual jointing position, i.e. desired holder position, is then adjusted by sliding and/or turning the holders 12, 13 and the cross member 2 relative to one another. The holders 12, 13 may hereby be moved translatorily in the X plane which lies in the longitudinal vehicle axis as well as in the Z plane which extends perpendicular thereto. In addition, it is possible, to turn the holders 12, 13 in relation to the longitudinal axis L of the cross member 2 in the slots 8, 9 and 10, 11, respectively. The rotatory degree of freedom between the holders 12, 13 and the cross member 2 is made clear by arrow R in FIG. 6. Once the jointing position has been established between the holders 12, 13 and the cross member 2, the components are joined together through material union, e.g. welding or soldering. The two holders 12, 13 are now disposed in parallel relationship at an axial distance a2.

Figure 2:
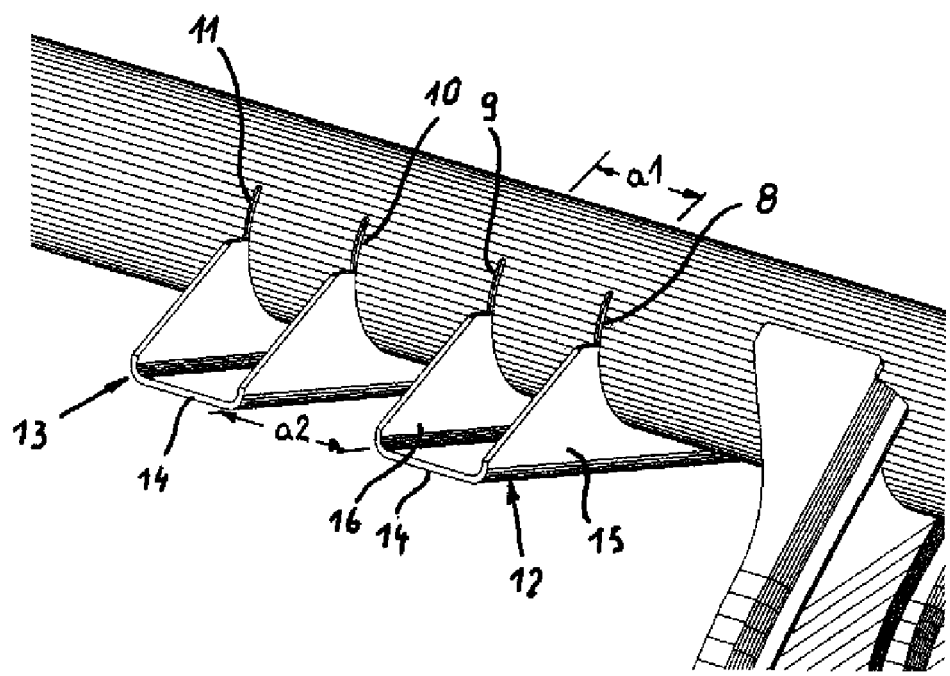
FIG. 2 is an enlarged detailed view of an area of a steering wheel attachment of the dashboard support of FIG. 1, depicting the presence of two holders in a middle position.
Figure 3:
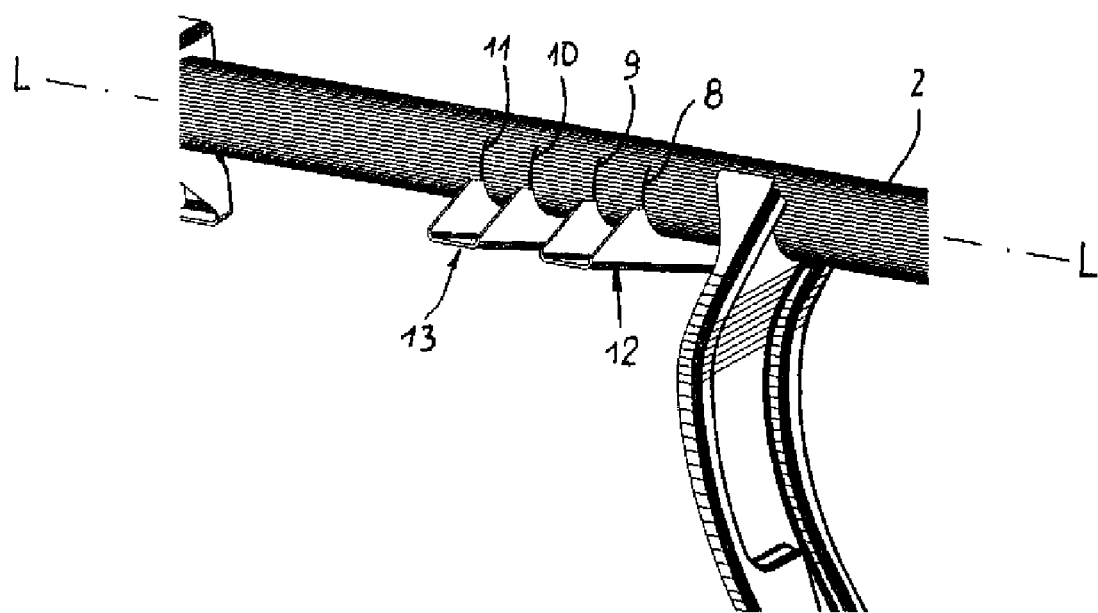
FIG. 3 is a detailed view of the steering wheel attachment similar to FIG. 2, depicting the two holders in a lower position.
Figure 4:
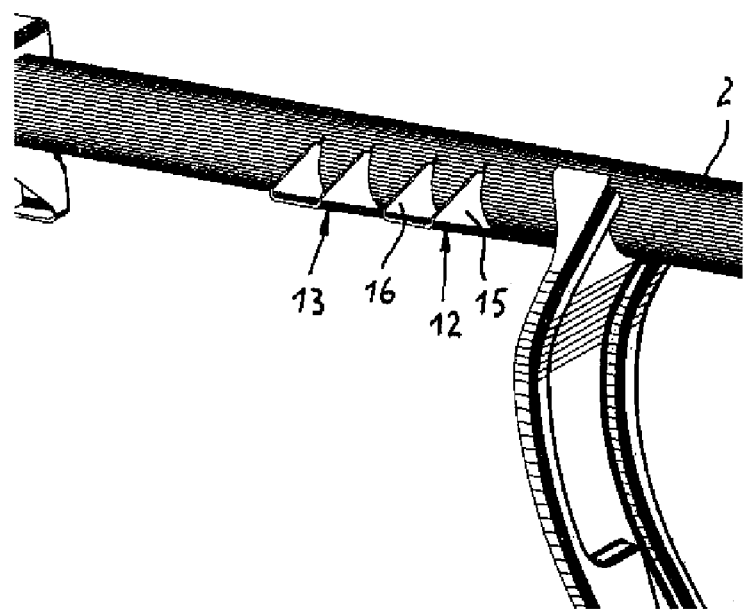
FIG. 4 is a detailed view of the steering wheel attachment similar to FIG. 2, depicting the two holders in an upper position.

FIGS. 2 to 7 depict in greater detail the flexibility and design option of the dashboard support 1 and of the attachment of the holders 12, 13 to the cross member 2. In FIG. 2, the holders 12, 13 assume a middle position. In FIG. 3, the holders 12, 13 assume a lower position, and in FIG. 4, the holders 12, 13 assume an upper position.

Figure 5:
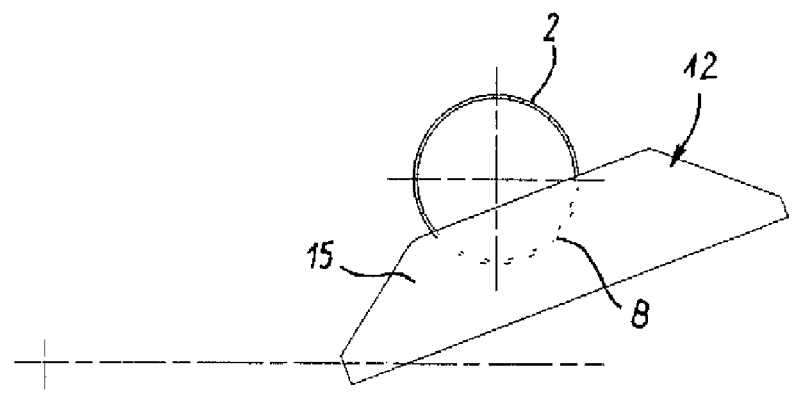
FIG. 5 is a schematic side view of a holder in middle position.
Figure 6:
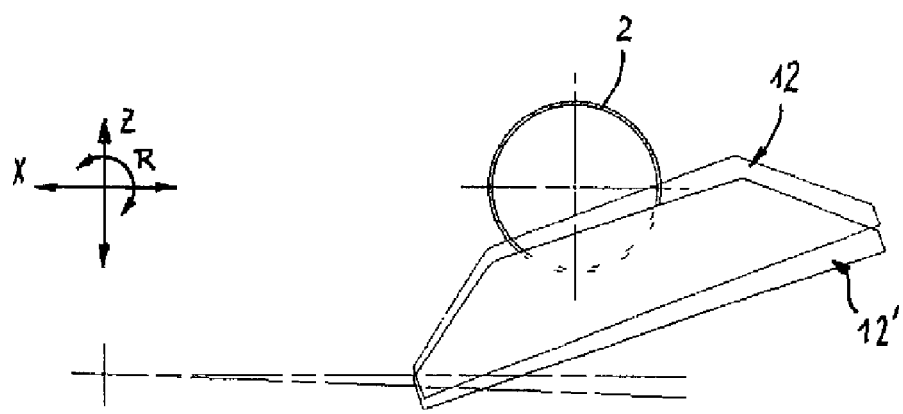
FIG. 6 is a schematic side view of a holder in radially shifted position.
Figure 7:
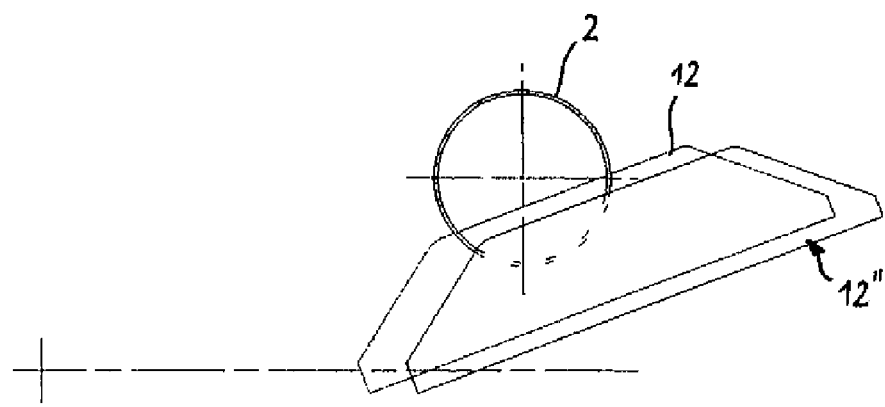
FIG. 7 is a schematic side view of a holder in translatorily shifted position.

FIG. 5 also shows holder 12 in the middle position. FIG. 6 shows holder 12 in a position which is radially shifted in relation to a middle position, with reference numeral 12' indicating the radially shifted position. The holder 12' is pivoted or tilted in the radially shifted position in relation to the middle position. FIG. 7 shows holder 12 in a position which is translatorily shifted in relation to a middle position, with reference numeral 12" indicating the translatorily shifted position. The holder 12 has hereby been shifted with its limbs 15, 16 in the slots 8, 9, 10, 11 to the right in the drawing plane.

A dashboard support 1 in accordance with the present invention is flexibly designed with a high degree of freedom for positioning the holder 12, 13 upon the cross member 2. On the basis of a basic module, the position and orientation of the holder 12, 13 and the cross member 2 can be widely varied. The same components, namely the cross member 2 with the slots 8, 9, 10, 11 and the holders 12, 13, can be used to make different variations of a dashboard support 1. The position of the holders 12, 13 and the cross member 2 can be adjusted to comply with vehicle specifications, and the holders 12, 13 and the cross member 2 can then be joined together in the required position.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:
1. A dashboard support for a motor vehicle, comprising:
a tubular cross member for installation between A-pillars of a vehicle body, said cross member having at least one slot oriented in a direction transversely to a longitudinal axis of the cross member, said at least one slot having a width and a circumferential length; and a holder joined to the cross member for attachment of functional vehicle components and having at least one limb received in the at least one slot, said at least one limb having a thickness which is slightly smaller than the width of the at least one slot to substantially prevent movement of the at least one limb installed in the at least one slot in a direction of the longitudinal axis of the cross member, and having a width that is less than the circumferential length of the at least one slot to allow only rotational and radial adjustment of a position of the holder in the at least one slot commensurate with specifications of the motor vehicle, before the holder is being joined to the cross member, and a material union joining the limb with the cross member after adjustment.

2. A dashboard support for a motor vehicle, comprising:

a tubular cross member for installation between A-pillars of a vehicle body, said cross member having at least one slot oriented in a direction transversely to a longitudinal axis of the cross member, wherein the slot has a length which exceeds a diameter of the cross member by more than half; and a holder joined to the cross member for attachment of functional vehicle components and having a limb received in the slot which is sized to allow adjustment of a position of the holder in relation to the cross member before the holder is being joined to the cross member, and a material union joining the limb with the cross member after adjustment.

3. A dashboard support for a motor vehicle, comprising:

a tubular cross member for installation between A-pillars of a vehicle body, said cross member having at least one slot oriented in a direction transversely to a longitudinal axis of the cross member, wherein the slot extends by more than 180° about a circumference of the cross member; and a holder joined to the cross member for attachment of functional vehicle components and having a limb received in the slot which is sized to allow adjustment of a position of the holder in relation to the cross member before the holder is being joined to the cross member, and a material union joining the limb with the cross member after adjustment.

4. The dashboard support of claim 1, wherein the holder has a U shaped configuration which is defined by two of said limb which are interconnected by a bridge, said cross member having two of said slot in parallel spaced-apart relationship for receiving the limbs of the holder in one-to-one correspondence.

5. A method of making a dashboard support for a motor vehicle, comprising the steps of:

forming slots in a first member to be used as a cross member of the dashboard support, with the slots oriented in a direction transversely to a longitudinal axis of the first member and having a width and a circumferential length;

inserting in the slots limbs of a second member to be used as a holder of the dashboard support, said limbs having a thickness which is slightly smaller than the width of the slots to substantially prevent movement of the limbs inserted in the slots in a direction of the longitudinal axis of the cross member, said limbs having a width that is less than the circumferential length of the slots to allow only rotational and radial adjustment of a position of the second member in the slots commensurate with specifications of the motor vehicle;

adjusting rotationally or radially, or both, a position of the second member in relation to the first member to establish a jointing position; and joining the limbs of the second member to the first member by a material union after adjustment.

6. The method of claim 5, wherein two of said second member are secured to the first member at an axial distance to one another.

7. The method of claim 5, wherein the slots of the first member are oriented parallel to one another in a direction transversely to a longitudinal axis of the first member.

8. The method of claim 5, wherein the adjusting step includes the step of sliding the limbs of the holder in the slots.

9. The method of claim 8, wherein the adjusting step includes the step of turning the limbs of the holder in the slots.

10. The dashboard support of claim 2, wherein the holder has a U shaped configuration which is defined by two of said limb which are interconnected by a bridge, said cross member having two of said slot in parallel spaced-apart relationship for receiving the limbs of the holder in one-to-one correspondence.

11. The dashboard support of claim 3, wherein the holder has a U shaped configuration which is defined by two of said limb which are interconnected by a bridge, said cross member having two of said slot in parallel spaced-apart relationship for receiving the limbs of the holder in one-to-one correspondence.

* * * * *